J. Blood,

Cheese Hoop.

No. 102,755.   Patented May 10, 1870.

Joel Blood
by his attorney
A. Pollok

WITNESSES.

United States Patent Office.

JOEL BLOOD, OF WATERTOWN, NEW YORK.

Letters Patent No. 102,755, dated May 10, 1870.

IMPROVEMENT IN BANDAGING AND BOXING CHEESE.

The Schedule referred to in these Letters Patent and making part of the same

*To whom it may concern:*

Be it known that I, JOEL BLOOD, of Watertown, county of Jefferson and State of New York, have invented certain new and useful Improvements in Bandaging and Boxing Cheese, of which the following is a specification.

My invention is directed to the production of a truss or bandage for cheese, which is capable of being removed from and applied to the cheese at any time during the process of curing, or afterwards, and which will also serve as the sides of the box in which the cheese can be kept or transported; and It consists in a cheese-truss or bandage provided with clasps, hooks, or cleats, or equivalent fastening devices, in the manner hereinafter described, so as to admit of the bandage being readily applied to or removed from the body of the cheese at pleasure.

Under this arrangement the bandage, while serving as a truss to properly sustain the cheese, may also be removed temporarily at any time, so as to allow the cheese to be rubbed and kept free from mold, which forms between the bandage and the cheese during the process of curing, and cannot be removed unless the bandage is so formed as to be readily taken off.

The manner in which my invention is or may be carried into effect is illustrated in the accompanying drawing, in which—

The bandage *a* is made of paper-board, or other suitable material, and is intended not only as a truss to uphold and support the cheese during the process of curing, but also as a box, in conjuction with top and bottom covers, to protect the cheese and fit it for shipping and transportation.

The paper bandage, as ordinarily used, is so bound around the cheese that it becomes fixed and permanently joined to the sides of the cheese during curing, so that it is impossible to remove the mold which gathers upon the sides of the cheese without destroying the bandage. And again, when the cheese, after being cured, is retailed or sold in small quantities, the bandage being a fixture, must be destroyed as the cheese is cut.

To remedy these difficulties I make the bandage so that it may at any time and without trouble be removed from or applied to the cheese; and to this end I provide the bandage with cleats, hooks, or other fastenings of a like nature, so arranged that the ends of the bandage may be drawn together and fastened, or loosened and detached from one another, as desired.

Figure 2:
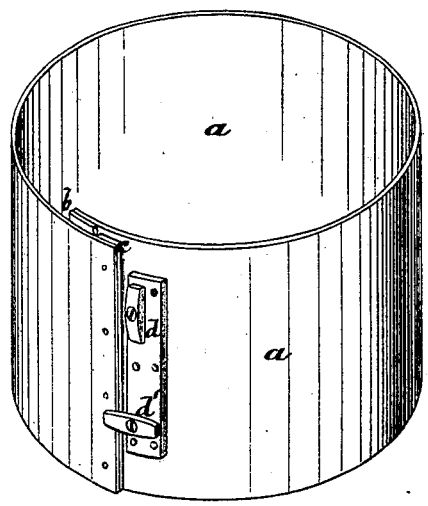
Figure 2 is a like view of the bandage provided with fastening devices slightly differing from those shown in fig. 1.

In fig. 2, the overlapping ends of the bandage are provided each with a cleat, one cleat, *b*, being fixed to the outer face of the inner end, the other, *c*, to the inner face of the outer end, so that, when the two ends are brought together and overlap each other, the cleat *c* will catch against the cleat *b* and prevent the drawing apart of the ends.

Turn-buttons *d d'* are provided and fixed upon the bandages, as seen in the figure, which, when turned, as shown at *d'*, will prevent the cleat *c* from being lifted away from the cleat *b*.

The bandage can at any time be removed by turning back the buttons so as to release the cleat *c*, after which the ends of the bandage may be disengaged from one another.

Figure 1:
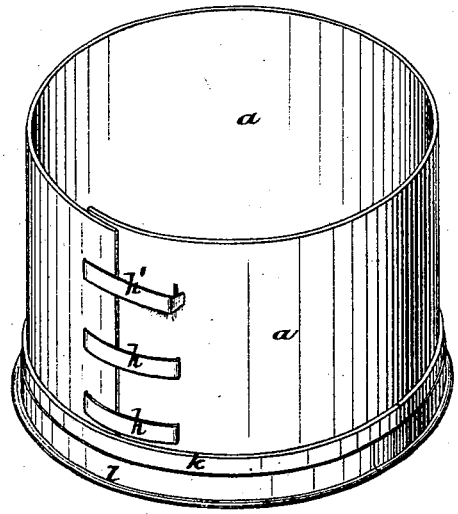
Figure 1 is a perspective view of the truss or bandage with the bottom cover applied to it.

In lieu of the cleats, I can employ metallic hooks or clasps *h*, shown in fig. 1. One end of each clasp is made fast to one end of the bandage, and upon the other end of the clasp is formed a hook.

This hook, when the two ends of the bandage are drawn together, is pressed through the other end of the bandage and into the cheese, and is thus held firmly to its place.

By this means the bandage is tightly and securely held upon the cheese, and at the same time can be readily loosened and removed by raising the hooks so as to lift them away from the bandage and cheese, as seen at *h'*.

An advantage attending the use of these hooks or clasps is that a bandage provided with them can be applied to varying sizes of cheeses, as the two ends of the bandage may be drawn together so as to overlap more or less, according to the size of the cheese, and the hooks can then be pressed down through the paper and into the cheese, as above stated.

I have described the devices I prefer to employ, but it is obvious that other fastening devices which will permit the ends of bandages to be held together or detached from one another, as desired, may be used.

After the cheese has been cured the bandage is combined with top and bottom covers, to form a box in which the cheese may be kept or transported.

Figure 3:
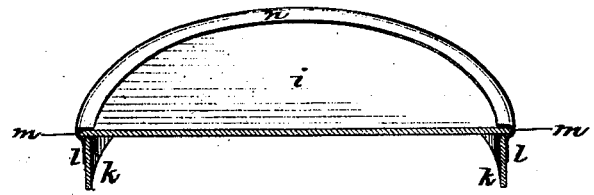
Figure 3 is a sectional view of one of the covers.

These covers I make as shown in fig. 3. Each is composed of a paper head, *i*, and sides *k*, which are held together by a metallic hoop, *l*.

This hoop is struck up with an annular recess or bead, *m*, and a flange, *n*, to receive and hold the edge of the disk or head *i*, around which the hoop is bent.

The sides *k* are fitted and held tightly in the hoop, and a very complete and inexpensive cover is thus made—one which can be easily and quickly manufactured.

Having now described my invention, and the manner in which the same is or may be carried into effect,

What I claim, and desire to secure by Letters Patent, is—

A cheese-truss or bandage formed of paper, the ends of which are provided with fastening devices substantially such as herein described, so as to admit of the bandage being applied to and removed from the cheese at pleasure, the said bandage serving as the sides of the box in which the cheese is packed after having been cured.

In testimony whereof I have signed my name to this specification before two subscribing witnesses.

JOEL BLOOD.

Witnesses:
JNO. C. McCARTIN,
A. M. UTLEY.